(12) United States Patent
Ahmavaara

(10) Patent No.: US 11,889,305 B2
(45) Date of Patent: *Jan. 30, 2024

(54) SYSTEM AND METHOD FOR SERVICE PROVIDER SPECIFIC REMOTE ACCESS VIA NEUTRAL HOST NETWORKS

(71) Applicant: CORNING OPTICAL COMMUNICATIONS LLC, Charlotte, NC (US)

(72) Inventor: Kalle Ahmavaara, San Diego, CA (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 691 days.

This patent is subject to a terminal disclaimer.

(21) Appl. No.: 17/029,622

(22) Filed: Sep. 23, 2020

(65) Prior Publication Data

US 2021/0006975 A1 Jan. 7, 2021

Related U.S. Application Data

(63) Continuation of application No. 16/176,396, filed on Oct. 31, 2018, now abandoned, which is a (Continued)

(51) Int. Cl.
*H04L 29/06* (2006.01)
*H04W 12/06* (2021.01)
(Continued)

(52) U.S. Cl.
CPC ............. *H04W 12/06* (2013.01); *H04L 45/74* (2013.01); *H04L 63/0823* (2013.01);
(Continued)

(58) Field of Classification Search
CPC ............................... H04L 63/08; H04L 63/10
See application file for complete search history.

(56) References Cited

U.S. PATENT DOCUMENTS 9,603,192 B2 3/2017 Mohebbi
2011/0235546 A1 9/2011 Horn et al.
(Continued)

FOREIGN PATENT DOCUMENTS

WO 2016/049353 A1 3/2016
WO 2017/211623 A1 12/2017
WO WO-2017211623 A1 * 12/2017 .......... H04W 12/003

OTHER PUBLICATIONS

European Patent Application No. 17821048.0; Extended Search Report dated Nov. 20, 2019; European Patent Office; 12 Pgs.
(Continued)

*Primary Examiner* — Izunna Okeke
(74) *Attorney, Agent, or Firm* — William D. Doyle

(57) ABSTRACT

Present systems and methods provide ways to provide access services to connecting wireless devices particularly for (but not limited to) neutral host networks. Steps include executing authentication between a connecting wireless device and a service provider, receiving an address of a remote gateway from the service provider, and providing access service for the wireless device including forwarding data received from the wireless device to the indicated remote gateway address in forwarding wireless device associated data received from the remote gateway address to the wireless device. Other ways are also disclosed.

19 Claims, 3 Drawing Sheets

Related U.S. Application Data continuation of application No. PCT/US2017/039402, filed on Jun. 27, 2017.

(60) Provisional application No. 62/354,916, filed on Jun. 27, 2016.

(51) Int. Cl.
| | |
|---|---|
| *H04W 76/12* | (2018.01) |
| *H04L 67/56* | (2022.01) |
| *H04L 67/563* | (2022.01) |
| *H04L 67/567* | (2022.01) |
| *H04L 9/40* | (2022.01) |
| *H04L 67/12* | (2022.01) |
| *H04L 45/74* | (2022.01) |
| *H04W 12/71* | (2021.01) |
| *H04L 61/5007* | (2022.01) |
| *H04W 88/02* | (2009.01) |
| *H04W 88/16* | (2009.01) |

(52) U.S. Cl.
CPC .............. *H04L 63/10* (2013.01); *H04L 67/12* (2013.01); *H04L 67/56* (2022.05); *H04L 67/563* (2022.05); *H04L 67/567* (2022.05); *H04W 76/12* (2018.02); *H04L 61/5007* (2022.05); *H04W 12/71* (2021.01); *H04W 88/02* (2013.01); *H04W 88/16* (2013.01)

(56) References Cited

U.S. PATENT DOCUMENTS

| | | |
|---|---|---|
| 2012/0135719 A1 | 5/2012 | John |
| 2014/0073289 A1 | 3/2014 | Velasco |
| 2014/0348062 A1 | 11/2014 | Anwar |
| 2015/0188949 A1 | 7/2015 | Mahaffey et al. |
| 2015/0264051 A1 | 9/2015 | Hoggan |
| 2016/0147506 A1 | 5/2016 | Britt et al. |
| 2016/0242194 A1 | 8/2016 | Mitola et al. |
| 2016/0270141 A1 | 9/2016 | Sharma et al. |
| 2017/0006513 A1 | 1/2017 | Lee et al. |
| 2017/0041859 A1 | 2/2017 | Martin et al. |
| 2017/0289799 A1* | 10/2017 | Hawkes ................ H04W 12/35 |
| 2017/0347272 A1 | 11/2017 | Ahmavaara et al. |
| 2018/0227835 A1 | 8/2018 | Martin et al. |
| 2019/0159268 A1 | 5/2019 | Nilsson et al. |

OTHER PUBLICATIONS

International Search Report and Written Opinion for PCT/US2017/039402, dated Sep. 13, 2017, 9 pages.
Non-Final Office Action for U.S. Appl. No. 15/634,017, dated Mar. 21, 2019, 6 pages.
Notice of Allowance for U.S. Appl. No. 15/634,017, dated Jul. 16, 2019, 9 pages.
Shivank Nayak, et al., Opportunistic Mobile Network Access, Oct. 2018, Technical Disclosure Commons: Defensive Publications Series, pp. 1-8.

* cited by examiner

SYSTEM AND METHOD FOR SERVICE PROVIDER SPECIFIC REMOTE ACCESS VIA NEUTRAL HOST NETWORKS

CROSS-REFERENCE TO RELATED APPLICATIONS

This application claims benefit of priority of U.S. provisional patent application Ser. No. 62/354,916, filed 27 Jun. 2016, entitled "SYSTEM AND METHOD FOR SERVICE PROVIDER SPECIFIC REMOTE ACCESS VIA NEUTRAL HOST NETWORKS", owned by the assignee of the present application and herein incorporated by reference in its entirety.

FIELD

The invention relates to neutral host networks, and access to network resources through the same.

BACKGROUND

3GPP systems, and access networks in general, provide devices with access to IP networks, and typically the IP network in question is the Internet. However, it is also possible to configure the IP network to be something other than the Internet, e.g., a local IP network (or intranet) directly accessible from the access network and which is isolated from the Internet, a remote P network via a preconfigured network VPN, and so on.

Problems exist in such networks, and have been attempted to be addressed in various ways. Here it is noted that the service provider (SP) is generally separate from the access network, i.e., they are independent entities. For example, if the access network provides the user with full Internet access, directly from the access network to the IP network, then the service provider, which is separate from the access network, has no control over the data, because the data goes directly to the Internet or to the local intranet from the access network. The service provider has no means to intercept or monitor the data.

Another option is that the access network provides connectivity to the service provider or remote network. In this way, the service provider can have a degree of control over the data, because it goes through the same. Thus, the service provider can decide what data will be allowed to be transmitted and what data will not be so allowed. However, this type of arrangement generally requires a degree of pre-configuration in the access network about the service provider. In this case, the access network knows a priori that whenever a UE from a particular service provider accesses the access network, such UEs have to be connected to the particular service provider's remote network, core network, or the like.

Such preconfiguration of the access network, especially a neutral host network, is generally undesired because the goal is that any UE can use any access network and thus any service provider can be served as easily and conveniently as possible Thus such preconfigurations limit flexibility considerably.

This Background is provided to introduce a brief context for the Detailed Description that follows. This Background is not intended to be an aid in determining the scope of the claimed subject matter, nor to be viewed as limiting the claimed subject matter to implementations that solve any or all of the disadvantages or problems presented above.

SUMMARY

In one aspect, the invention is directed towards a method for using a Neutral Host Network (NHN) to provide access services to connecting Wireless Devices (WD), including: in a NHN, executing authentication between a connecting WD and a Service Provider (SP); receiving an address of a remote gateway (RG) from the SP; and providing access service for the WD including forwarding data received from the WD to the indicated RG address and forwarding WD associated data received from the RG address to the WD.

Implementations of the invention may include one or more of the following. The NHN may utilize MulteFire, LTE, or 5G radio technology. The NHN may apply a network tunnel to the RG. At least one of the forwarding steps may include IP forwarding. The SP may be a participating service provider (PSP). The SP may provide an online sign-up (OSU) service or an Internet of things (IOT) service. The providing access service may include providing a service for an OSU service or for IOT service. The WD may connect to the NHN for an OSU service. The WD may be an IOT device. The method may further include receiving information about the RG from the SP, and forwarding an indication of the information to the WD. The received information may include the address of the RG and/or instructions about authentication of the WD towards the RG. The WD may be preconfigured to know an address of the RG. The authentication may be based on a device certificate within the WD.

In another aspect, the invention may be directed towards a non-transitory computer readable medium, including instructions for causing a computing environment to perform the method described above.

In yet another aspect, the invention may be directed towards an access network, configured to perform the method described above.

In yet a further aspect, the invention is directed towards a method for a service provider (SP) to provide access services via a neutral host network (NHN), including: in a first authenticating step, authenticating a connecting WD via an NHN, the WD connecting for access service, the first authentication constituting an access authentication; providing an address of a remote gateway (RG) to the NHN; and receiving and transmitting data with the WD via the NHN and via the RG.

Implementations of the invention may include one or more of the following. The authentication may be based on a device certificate. The method may further include, in a second authenticating step, authenticating the WD via the RG for a RG session authentication. The second authentication may authenticate the UE with the SP such that the SP can associate data transmitted through the RG with the appropriate UE. The RG may be associated with a tunnel connection between the UE and the SP. The title may be shared. The second authentication may authenticate using https. The second authentication may be based on the same credentials as the first authentication. The first authentication may be performed via a AAA server associated with the SP, and the first authentication may grant access to the NHN by the WD. The method may further include detecting misuse of the RG based access service by an authenticated WD and transmitting a signal to the NHN to disconnect the WD from the NHN. The NHN may utilize MulteFire, LTE, or 5G radio technology. The SP may be a participating service provider (PSP). The SP may provide an online sign-up (OSU) service or an Internet of things (IOT) service. The providing access service may include providing a service for an OSU service or for IOT service. The WD may connect to the NHN for an OSU service. The WD may be an IOT device.

In another aspect, the invention is directed towards a non-transitory computer readable medium, including instructions for causing a computing environment to perform the above described method.

In another aspect, the invention is directed towards a service provider server, configured to perform the above described method.

In yet another aspect, the invention is directed towards a method for a Wireless Device (WD) to connect to a neutral host network (NHN) for access service, including: performing authentication of the WD with a service provider (SP) via a MIN for access service; receiving information associated with a RG via the NHN; applying the received information to communicate with the RG via the NHN.

Implementations of the invention may include one or more of the following. The received information about the RG may include an address of the RG and/or instructions about authentication towards the RG. The applying the received information to communicate with the RG may include performing an authentication step. The authentication may be performed using the same credentials that were used for the authenticating the WD with the SP. The NHN may utilize MulteFire, LTE, or 5G radio technology. The SP may be a participating service provider (PSP). The SP may provide an online sign-up (OSU) service or an Internet of things (IOT) service. The WND may connect to the NHN for an OSU service. The WND may be an IOT device. The authenticating may be based on a device certificate within the WD. The communications between the WD and the RG may include a second authentication. The second authentication, for the RG session, may be based on the same credentials as the first authentication, for access service.

In another aspect, the invention is directed towards a non-transitory computer readable medium, including instructions for causing a computing environment to perform the above described method.

In another aspect, the invention is directed towards a wireless device, configured to perform the above described method.

Advantages of the invention may include, in certain embodiments, one or more of the following. Access may be provided for connecting wireless devices to neutral host networks in a particularly convenient way, and in ways that allow devices from multiple service providers to connect. Other advantages will be understood from the description that follows, including the figures and claims.

BRIEF DESCRIPTION OF THE DRAWINGS

Like reference numerals refer to like elements throughout. Elements are not to scale unless otherwise noted.

DETAILED DESCRIPTION

Figure 1:
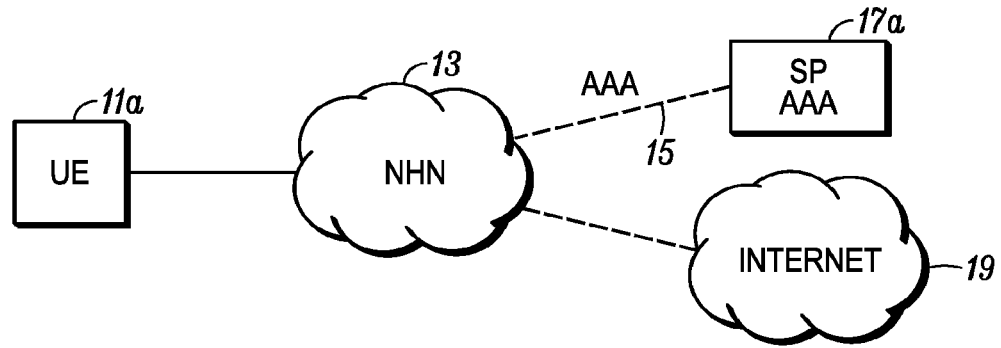
FIG. 1 shows a system according to one implementation of present principles.

In one implementation, systems and methods according to present principles may be embodied within the MulteFire Framework, described in part at U.S. Provisional Patent Application Ser. No. 62/342,788, filed May 27, 2016, entitled "System and Method for Virtual Radio Cell" which is incorporated by reference herein in its entirety. In particular, systems and methods according to present principles may advantageously operate in unlicensed spectra/bands, although the same may also operate within licensed spectra/bands or in shared radio bands or other bands with possibilities of multiple competing systems.

The MulteFire Alliance specifies modifications to LTE to allow the same to operate in unlicensed bands, and such modifications may be employed to construct and enable the technologies described here. Such modifications include, e.g., "listen before talk," that are required in unlicensed bands and that are not usually used in the licensed bands.

Another modification within the MulteFire Framework is the provision of a new network architecture termed a neutral host network (NHN), which is based on the existing LTE network architecture, but which is modified in such a way that it is more convenient to deploy in smaller self-contained networks. For example, an NHN may exist in a stadium, hotel, enterprise, or shopping mall. The NHN itself does not generally have "subscribers" associated with it; rather, it supports subscribers of other networks or providers, i.e., one NHN can support multiple service providers. Such service providers may include, e.g., mobile operators such as AT&T, Verizon, Sprint, T-Mobile, and so on. And an NHN may also support users that are not associated with any mobile operator, e g, the NHN can support other service providers such as Google, Boingo, and so on, which are not mobile operators but which have or are able to establish another sort of relationship with the end user.

A typical NHN may be paid for and installed by a service provider, but may also be paid for and installed by a venue, e.g., hotel, stadium, enterprise, or shopping center, and in this way such premises may ensure sufficient data coverage for all users thereon. It is expected that such venue financed NHNs are likely, as a given installation may not be cost effective for a larger service provider, although a given service provider may be enabled to provide and/or sell access to other service providers later. Where the NHN is financed by the venue, the venue could sell access to service providers as well NHNs in such venues are a particularly appropriate use of unlicensed spectra and the MulteFire framework.

Accordingly, the provisional patent application incorporated by reference above provides disclosure for the situation where UEs from multiple service providers are accessing a single network architecture. While systems and methods according to present principles may be incorporated in such situations, the same systems and methods may be particularly appropriate for cases where users not associated with mobile operator networks are accessing the system, e.g., users without SIM cards in their UE devices. The system and method may also apply to users with UEs with SIM cards, but desiring to use the NHN independently of the SIM card. Users with SIM cards may generally access the NHN using their subscription, while users without SIM cards (or users not desiring to use their SIM card for the service) require special processing to connect to the NHN and associated service provider as described herein. A typical situation is similar to where a user is at, e.g., an airport, and desires to use their laptop and connect to a network using WiFi. They may connect to a WiFi network such as Boingo for a small fee paid by their credit card, obtaining a subscription on demand. In the present case, however, rather than just WiFi, the NHN employs LTE or MulteFire radio technology.

Present systems and methods may be particularly useful in the context of an NHN, where the same is an access network that is more particularly defined as a self-contained access network that operates on its own, and that contains all the functions required to provide access service, as opposed to a RAN or 3GPP radio access network that is tightly coupled with a service provider specific core network. The NHN generally does not have its own subscribers, i.e., it serves subscribers from other service providers, and the NHN provides similar access services to such subscribers, independently from the network or provider the subscriber is associated with. In such systems generally service provider functionality is separated from access provider (NHN) functionality, making it particularly convenient for one NHN to support a multitude of service providers, and vice versa.

In this context it is also noted that the term "service provider" is used to mean any entity which can charge or which has a billing or other relationship with the end-user, e.g., a mobile operator such as AT&T or Verizon, a Wi-Fi provider such as Boingo, Cox, Comcast, or Time Warner, entities which provide other services such as Apple, Microsoft, Google, or Samsung, and so on. Examples of access network (NHN) providers include premises or venue owners such as stadiums, hotels, enterprises, shopping centers, and so on. NHN providers may also be 3rd parties providing NHN as a service for the aforementioned entities as a service or deploying and operating NHN on their premises. Access network providers may also include entities which provide Wi-Fi networks, such as Boingo, Cox, Time Warner, and so on.

FIG. 1 illustrates an exemplary implementation according to present principles.

As may be seen, much of the above design is a robust AAA solution 15 between the NHN(s) 13 and the SPs 17a, in a many-to-many configuration, and the same supports radius or diameter based AAA signaling between the NHN and the SP. In the above architecture, the NHN has a backhaul to the Internet and there is a control interface to the service provider. An AAA server provides the requisite authentication of the UE 11a. That is, when the UE connects to the NHN, it first has to authenticate itself with the service provider, and only when the service provider authenticates the UE and subsequently authorizes the NHN access to the NHN, the UE is connected to the Internet. Much of the design is focused on the authentication between the NHN and the service provider, and the architecture may support multiple EAP methods between the UE and the SP, e.g., use of SIM cards, certificates, and so on. It is noted here that, while NHNs themselves are not new, their design has so far been mostly about enabling this robust authentication framework between NHNs and SPs, while assuming that NHNs provide direct Internet access to all authenticated devices. In other words, once authentication is performed, the NHN provides Internet access for all devices. This may be contrasted to more complicated networks, e.g., 3GPP networks, in which numerous arrangements are provided in which, e.g., all traffic gets routed to the UE's home network, different connections are provided for voice traffic versus Internet traffic, and so on.

Example Use Case—Online Sign-Up

One problem with the above system involves how to handle restricted Internet connections, e.g., how the NHN can perform traffic filtering so that only desired traffic is allowed. A related problem is termed the "Online Sign-Up (OSU)" problem, and the same constitutes one of the driving use cases for systems and methods according to present principles.

Figure 2:
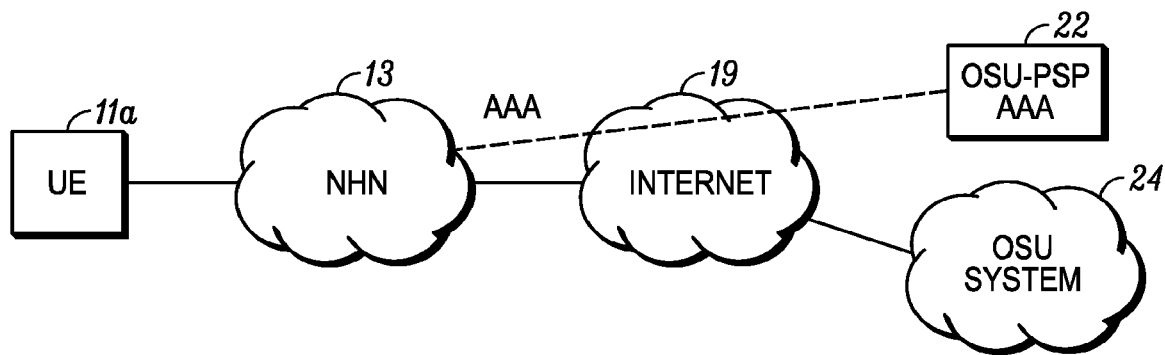
FIG. 2 shows a system according to one implementation of present principles.

In particular, a requirement of many implementations of the present systems and methods is that the NHN should support the UE being provisioned, there should be a way for the UE to sign up for access from a service provider using the NHN itself, i.e., should be able to sign up for a service and get credentials for that service from a service provider through the NHN, e.g., subscription specific credentials. FIG. 2 illustrates this situation.

In this scenario, it is desired that the UE 11a be able to detect the presence of the NHN 13, and also be able to determine that the NHN supports OSU and in particular an OSU system 29. In this way, the UE can obtain a subscription on demand by, e.g., entering credit card information or the like, and thus get credentials associated with the subscription, which it can then use to connect to the Internet via the NHN. The OSU functionality allows the sign-up, but after the sign-up, the received credentials allow the UE to be provisioned and to access the Internet just like any other credentialed device.

To enable and allow the authentication of a device that has no subscription, one solution is that each device has a device certificate. Using such a certificate, the device is able to securely authenticate itself with any of the OSU providers. The device certificate does not mean that a subscription is present, but rather is only used for authentication within the context of an OSU. One way of providing such a certificate is during manufacture, where when the device is manufactured so as to enable use of MulteFire radio technology, a device certificate is situated within the device. In this way, the device certificate may be provided from entities such as Intel, QUALCOMM, Apple, Motorola, Samsung, and so on. Other ways may also be employed in which a device may be provisioned with the device certificate, even after its manufacture.

One drawback of this approach is that it becomes important to ensure that the connection via NHN established by using the device certificate is used only for OSU, and not misused for other purposes, including attempts to obtain Internet access.

In systems and methods according to present principles, regarding the problem of how to enable restricted Internet connections, as described above, one solution includes using the NHN to perform traffic filtering so that only desired traffic is allowed. For example, the NHN may be configured such that only a certain IP address is accessible and authorized, and then the NHN blocks all other traffic that is unauthorized. However, it is not generally in the interest of the NHN to perform such filtering, as it results in lesser traffic. Such filtering would be generally better performed by the service provider itself. That is, it is more appropriate for the service provider to control data and site traffic by their associated UEs. In addition, when an NHN attempts to perform such filtering, there are ways in which malicious or rogue devices can attempt to circumvent the same and misuse the "pinhole" that was created.

Figure 3:
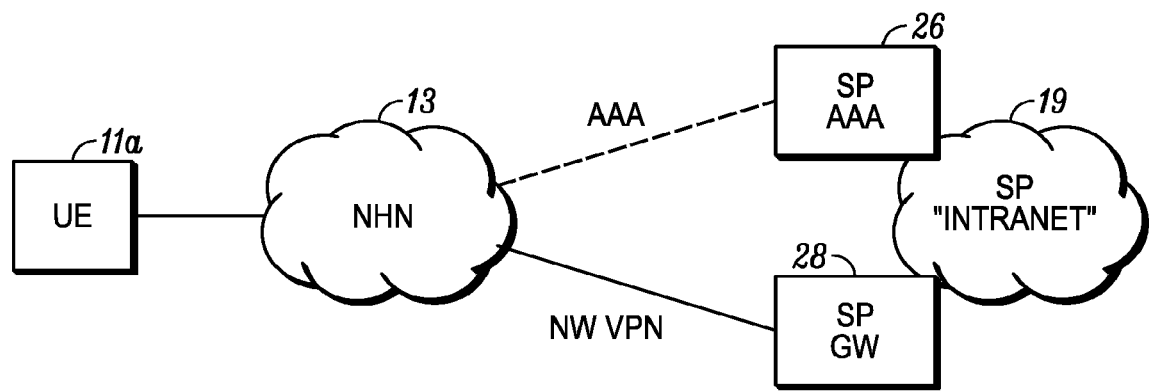
FIG. 3 shows a system according to one implementation of present principles.

One way of performing a solution is described in FIG. 3.

As may be seen, whenever a UE 11a asks for an OSU, instead of connecting the device to the Internet upon authentication, the NHN 13 connects the device to a remote gateway (RG). In other words, once the device is authenticated, the NHN sets up a tunnel to a remote gateway at the service provider, forcing all the traffic to go through the tunnel. Wherever the UE is attempting to transmit to or receive from, the NHN does not route the traffic to the Internet but rather forces the same through the tunnel. All traffic is routed to the service provider's specific gateway 28, and then the service provider that controls the traffic, including allowing or blocking certain data or Internet addresses. In this scheme the NHN is not really providing Internet access, but is providing custom remote access for the UE by a special tunnel to the service provider's gateway 28.

The nature of the tunnel may vary, but may be accomplished by, e g, a type of VPN to the service provider's gateway. Once the tunnel is established, the role of the NHN is to serve primarily as a bridge or forwarder between the UE and the service provider. In this way, the NHN need not perform any filtering—all data traffic may be sent back and forth, and it is up to the service provider to allow or block the data. The UE is not provided with "Internet access" but rather "service provider access". It is noted that, while the tunnel could be preconfigured in the NHN, such is undesired for the same reason noted above that other sorts of pre-configurations within the MIN are not desired, as it is disadvantageous to require such pre-knowledge of the service provider within the NHN.

It is noted in this context that the UE 11a is authenticating itself to the service provider AAA server 26 already, using the above-noted device certificate. Whenever this authentication is happening, the SP may determine that the UE does not have a subscription for which Internet access may be directly provided, but rather is the type of UE for which restricted or remote access is provided through the RG. The service provider notifies the NHN, through the AAA signaling, of the requirement of use of the RG and the location of the same (i.e., the "NW tunnel information") through which the UE should be connected to. That is, the UE will not be connected directly to the Internet but rather will be provided an address through the NHN through which all traffic to the UE will be forwarded. The NHN receives the address and begins to apply it for all traffic to and from that UE. That is, the AAA signaling includes information about the remote gateway, and the NHN performs traffic forwarding between the SP (NW tunnel) and the UE (access connection), instead of routing it to the Internet. Traffic may then be routed to/from/through a service provider intranet 19.

Figure 4:
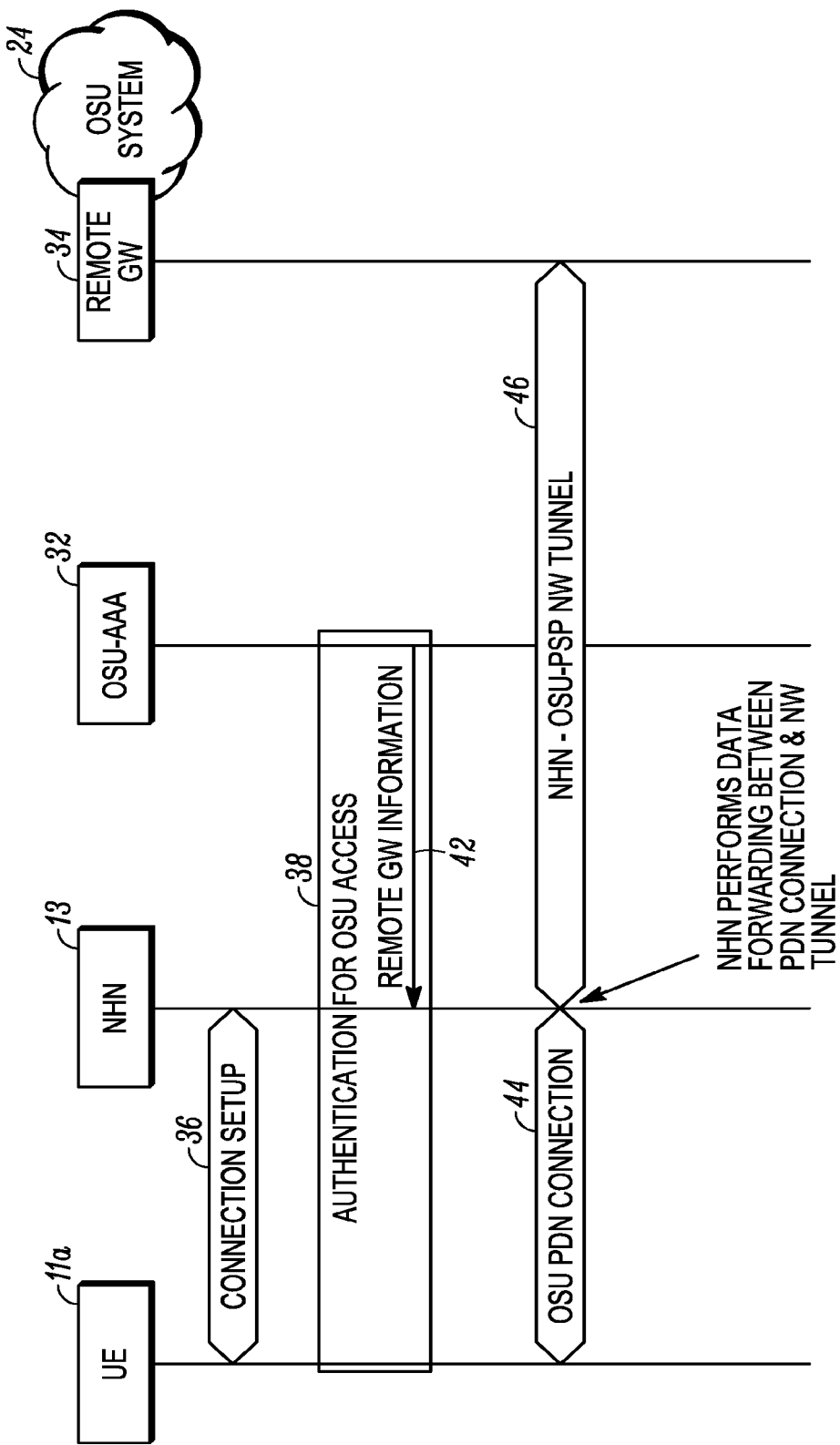
FIG. 4 shows a sequence diagram according to an implementation of present principles.

FIG. 4 illustrates a signal flow for the online sign-up use case.

In one method according to present principles, a UE 11a or other wireless device (WD) discovers an NHN 13 and retrieves information about supported online sign-up participating service providers (PSPs). In this example the UE/WD decides to connect (step 36) to an OSU PSP for performing OSU. The UE sets up a connection to the NHN for the OSU. The UE authenticates itself with the selected OSU PSP using the device certificate (step 38). That is, the UE/WD connects to the NHN, and then the NHN performs authentication for OSU access with the AAA server. During the authentication the AAA server 32 provides the remote gateway 34 information 42 to the NHN. Because there is this remote gateway information provided to the NHN, the NHN sets up (or applies, if it is already set up) the NHN Online SignUp Service Provider (OSU-PSP) network tunnel 46, the remote gateway information. The remote gateway information contains at least an address towards which the NHN should set up or apply a tunnel for all traffic for the connecting UE. The remote gateway information may also include an indication that the UE should or should not be informed about the remote gateway use. In case the UE is to be informed about the gateway use, the remote gateway information may contain information to be forwarded to the UE, such as the remote gateway address and/or authentication instructions.

The NHN sets up the requested tunnel to the indicated address. This step is not required if a suitable tunnel is already established. The NHN maps the tunnel and the connection towards the UE. In this connection it is noted that, also due to the successful authentication, the UE is allowed to connect to the NHN using the PDN connection 44, and then the NHN performs data forwarding between the two "pipes", e.g., the OSU PDN connection 44 and the OSU-PSP NW tunnel 46.

Traffic forwarding may include just IP forwarding, i.e., the remote gateway becomes the default route applied by the NHN for UE originating IP data, and the UE PDN connection is the default route applied by the NHN for UE associated IP data received from the remote gateway. In this case, the UE IP address is allocated by the NHN and the UE's IP point of attachment is the NHN. Traffic forwarding may alternatively be below IP, and thus include also DHCP and DNS message forwarding, allowing the remote system to allocate the UE IP address and thus become the IP point of attachment for the UE.

Based on the received remote gateway information, the NHN informs the UE that a remote access connection is established. The NHN provides the UE with the address of the remote gateway and indicates to the UE that it needs to authenticate itself to the remote gateway, e.g., using the same credentials it used for the access authentication. This information may be provided via, e.g., DHCP, PCO, or other transport options.

The UE authenticates itself to the remote network using the device certificate. Use of the same certificate also for this (second) RG session authentication enables the OSU PSP to associate the UE's IP traffic with the earlier access authentication performed via AAA. The OSU PSP ensures that the UE has access to all the necessary resources for online sign-up and does not have access as to resources that are not desired to be made available for the UE. For example, the OSU PSP may have its own subnet for the online sign-up process, and all OSU resources may be located within that subnet and accessible via, e.g., an https connection. Access to other subnets or the Internet is then not available via the OSU subnet.

In the system, as shown in the above figure, the OSU system may be present behind the remote gateway, and the OSU system 24 may represent a single server that is fully separated from the Internet, i.e., no other connection exists from the OSU system to the Internet, thus ensuring the device cannot communicate with any other device besides the OSU system.

In the case where the UE is misusing the connection or otherwise misbehaving, e.g., sending traffic not associated with online sign-up, the OSU PSP may detect the abnormal IP traffic and may be able to disconnect the corresponding UE (identified by device certificate) from the NHN using AAA signaling.

The OSU PSP may also meter all data exchanged by authenticated UEs doing OSU and is thus able to verify any billing statements received from the NHN.

Once the UE and the user have completed the OSU procedure, e.g., a subscription created/activated and credentials provisioned, the UE may disconnect from the OSU system and in some cases from the NHN. The UE may reconnect to the NHN using the newly-provisioned credentials to obtain regular service.

Other Examples

The above description describes in particular an implementation of systems and methods according to present principles in which online sign-up is desired of a device that does not have an existing subscription to a service provider; however, it will be understood that such systems and methods may also apply to other use cases. For example, the service provider may desire to restrict access for other purposes. Such may wish to authorize only very specific addresses, e.g., for "Internet of Things" (IOT) devices, e.g., a car, appliance, fitness monitor, and so on, where communications are very limited, e.g., a measurement needs to be reported to a cloud server. In these cases, the service provider could use the above-noted implementation to limit data transfer to only certain locations.

Such devices may still require a degree of authentication with the service provider, e.g., using the noted device certificate, but other means of authentication will also be understood. It will further be understood that the types of authentications may vary. For example, IOT devices may be preconfigured with appropriate username/password authentication or the like, or may use another means to identify themselves to the service provider.

Other examples and uses will also be understood, particularly where cases where it is desired to not grant full Internet access to UEs directly from the NHN, but where access to resources should be granted and accessible through a remote gateway.

Several aspects of telecommunication systems will now be presented with reference to gateway described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing software. The non-transitory computer-readable media may be resident in the processing system, external to the processing system, or distributed across multiple entities including the processing system. Non-transitory computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

The above description illustrates various exemplary implementations and embodiments of the systems and methods according to present principles. The invention is not limited to such examples. The scope of the invention is to be limited only by the claims appended hereto, and equivalents thereof.

What is claimed is:

1. A method for using a Neutral Host Network (NHN) to provide access services to connecting Wireless Devices (WD), comprising:

in a 5G radio NHN, executing a first authentication for access between a connecting WD and a Service Provider (SP) based on first authentication information received from the connecting WD;

receiving an address of a remote gateway (RG) from the SP;

receiving second authentication information from the connecting WD and forwarding the second authentication information to the SP such that the SP can associate data transmitted through the RG with that particular connecting WD based on at least the second authentication information;

providing access service for the connecting WD including forwarding data received from the connecting WD to the indicated RG address;

IP forwarding WD associated data received from the RG address to the connecting WD;

receiving information about the RG from the SP; and forwarding an indication of the information to the connecting WD, wherein the received information includes at least one of the address of the RG and instructions about authentication of the connecting WD towards the RG.

2. The method of claim 1, wherein the NHN applies a network tunnel to the RG.

3. The method of claim 2, wherein:

the SP provides at least one of an online sign-up (OSU) service and an Internet of things (IOT) service; and the providing the access service includes providing a service for at least one of the OSU service and the IOT service.

4. The method of claim 2, wherein the SP provides at least one of an OSU service and an Internet of things IOT service.

5. The method of claim 2, wherein providing the access service includes providing a service for at least one of an OSU service and an IOT service.

6. The method of claim 2, wherein the SP is a Wi-Fi provider.

7. A method for using a Neutral Host Network (NHN) to provide access services to connecting Wireless Devices (WD), comprising:

in a 5G radio NHN, executing a first authentication for access between a connecting WD and a Service Provider (SP) based on first authentication information received from the connecting WD;

receiving an address of a remote gateway (RG) from the SP;

receiving second authentication information from the connecting WD and forwarding the second authentication information to the SP such that the SP can associate data transmitted through the RG with that particular connecting WD based on at least the second authentication information;

providing access service for the connecting WD including forwarding data received from the connecting WD to the indicated RG address; and IP forwarding WD associated data received from the RG address to the connecting WD, wherein, the SP provides at least one of an online sign-up (OSU) service and an Internet of things (IOT) service; and the providing the access service includes providing a service for at least one of the OSU service and the IOT service.

8. The method of claim 7, wherein the NHN applies a network tunnel to the RG.

9. The method of claim 7, wherein the SP is a participating service provider (PSP).

10. The method of claim 9, wherein the SP is a Wi-Fi provider.

11. The method of claim 7, further comprising receiving information about the RG from the SP, and forwarding an indication of the information to the connecting WD, wherein the received information includes at least one of the address of the RG and instructions about authentication of the connecting WD towards the RG.

12. The method of claim 11, wherein the SP is a Wi-Fi provider.

13. The method of claim 12, wherein the NHN applies a network tunnel to the RG.

14. A method for a service provider (SP) to provide access services via a 5G radio neutral host network (NHN), comprising:

in a first authenticating step, authenticating a connecting Wireless Device (WD) via an 5G radio NHN in a first authentication, the connecting WD connecting for access service, the first authentication constituting using an access authentication comprising first authentication information received from the connecting WD;

providing an address of a remote gateway (RG) to the 5G radio NHN;

in a second authenticating step, authenticating the connecting WD via the RG for a RG session in a second authentication, wherein authenticating the connecting WD via the RG for the RG session comprises receiving second authentication information from the connecting WD that is forwarded through the 5G radio NHN and the second authenticating step authenticates the connecting WD with the SP such that the SP can associate data received from the connecting WD as being from that particular connecting WD based on the first authentication and the second authentication; and receiving and transmitting data with the connecting WD via the 5G radio NHN and via the RG, wherein the SP provides at least one of an online sign-up (OSU) service and an Internet of things (IOT) service; and the providing the access service includes providing a service for at least one of the OSU service and the IOT service.

15. The method of claim 14, wherein the first authentication is performed via a server associated with the SP, and wherein the first authentication grants access to the 5G radio NHN by the connecting WD.

16. The method of claim 15, wherein at least one of the first authentication and the second authentication is based on a device certificate.

17. The method of claim 16, wherein the RG is associated with a tunnel connection between the connecting WD and the SP, and wherein the tunnel connection is shared.

18. The method of claim 16, further comprising detecting misuse of an RG based access service by an authenticated WD and transmitting a signal to the 5G radio NHN to disconnect the authenticated WD from the 5G radio NHN.

19. The method of claim 16, wherein the SP is a Wi-Fi provider.

\* \* \* \* \*